United States Patent [19]
Weiner et al.

[11] Patent Number: 4,734,928
[45] Date of Patent: * Mar. 29, 1988

[54] CELLULAR MOBILE PHONE WITH A PLURALITY OF ACCESSING TELEPHONE NUMBERS FOR ALLOWING ACCESS TO THE MOBILE PHONES BY ANY ONE OF THE TELEPHONES NUMBERS

[75] Inventors: Sheldon Weiner; Sherwin A. Brook, both of Northbrook; Michael G. Freitag, Palos Park, all of Ill.

[73] Assignee: B/W Investments, Chicago, Ill.

[ * ] Notice: The portion of the term of this patent subsequent to Jun. 30, 2004 has been disclaimed.

[21] Appl. No.: 27,179

[22] Filed: Mar. 18, 1987

Related U.S. Application Data

[63] Continuation of Ser. No. 874,577, Jun. 16, 1986, Pat. No. 4,677,653.

[51] Int. Cl.$^4$ .............................................. H04M 11/00
[52] U.S. Cl. ........................................ 379/59; 379/63; 379/357
[58] Field of Search ...................... 379/58, 59, 63, 357

[56] References Cited

U.S. PATENT DOCUMENTS 3,581,019  5/1971  Ryan ..................................... 379/63
4,486,624  12/1984  Puhl et al. ........................ 379/60 X Primary Examiner—Robert Lev
Attorney, Agent, or Firm—Milton S. Gerstein; Marvin N. Benn

[57] ABSTRACT

An adapter for a cellular mobile phone unit which converts the unit to permit simultaneous insertion of a plurality of telephone numbers. A main circuit board is coupled to a microprocessor of the unit, which board includes a plurality of number assignment modules, or NAM's (ROM's), each NAM having its own unique telephone number code. The NAM's are connected such that fifteen of the sixteen pin-connections of each NAM are correspondingly and respectively connected in series, for coupling to the fifteen pin-connections of a plug at one end of a ribbon cable, the other end of the ribbon cable being coupled to the microprocessor of the unit via the conventional NAM connection therefor. Each remaining pin of each NAM, which is not connected in series, is connected to a unique stop of a multi-position switch, so that a selected one of the NAM's may be coupled to the microprocessor in order to change the telephone number from one to another. A secondary relay printed circuit board may also be provided to allow for remote switching from one NAM to another. The principles are also applicable to a personal computer's expansion slots, where a plurality of dedicated ROM chips may be selectively accessed by the microprocessor via the same address location.

6 Claims, 4 Drawing Figures

CELLULAR MOBILE PHONE WITH A PLURALITY OF ACCESSING TELEPHONE NUMBERS FOR ALLOWING ACCESS TO THE MOBILE PHONES BY ANY ONE OF THE TELEPHONES NUMBERS

This is a continuation of co-pending application Ser. No 874,577, filed on June 16, 1986, now U.S. Pat No. 4,677,653.

BACKGROUND OF THE INVENTION

The present invention is directed to a device for multiplying the quantity of cellular mobile phone identification call numbers or telephone numbers for one mobile phone unit. Cellular mobile phones are typically mounted in an automobile, truck, van or the like, allowing access to fixed-wire telephone systems, as well as other mobile phones, whereby a mobile phone user may call a fixed land-based phone or another mobile phone.

Under present conditions, the cellular mobile phone system is divided into a plurality of cells or grids defined by stationary transmitter-receiver stations, each of which is connected to a switching station connecting the cell or grid to the land-based, fixed-wire telephone system. Each cell or grid is designed to allow each mobile phone access to the land-based phone system, or to allow a land-based or mobile phone access to another mobile phone, according to a principle in which that cell that receives the transmitting and/or receiving signal from a mobile phone or mobile phones is that cell which is made operative for transmitting and/or receiving the call. Thus, for example, when a mobile phone subscriber attempts to make a phone call to another mobile phone, or a land-based phone, that call which receives the strongest signal from the transmitter of that particular mobile phone is the one made operative for connection to the phone being called. If, after connection or during the initialization of the call, the calling mobile phone travels beyond the effective range of the cell originally handling the call, another cell which receives the signal stronger than the original cell, receives the transmitting signal from the calling mobile phone, and an automatic system transfer from the first cell to the second cell occurs. Thus, during the process of calling, and during the call itself, whenever the mobile phone transfers from the effective range of a first cell to the effective range of a second cell, the second cell takes over from the first cell. This may occur many times, depending upon the distance the mobile phone unit travels during the telephone call, and depending upon the number of effective cell zones through which the phone may travel.

Each mobile unit, which is comprised of a transmitter-receiver (commonly referred to as a transceiver), includes a call-channel selector which controls a frequency synthesizer to span the available call-channel frequencies and, in combination with a microprocessor, selects that call-channel which is received the strongest in order to select the cell closest to the mobile unit. Each mobile phone has its own unique telephone or use number by which it may be accessed by another mobile phone or land-based mobile phone. With presently known and used systems, each mobile phone is allowed only one such telephone number. This unique number is included on a ROM chip addressed by the microprocessor of the mobile unit. However, because only one user number is possible for each mobile unit, the owner of such mobile unit is restricted to only one mobile telephone service.

Since each mobile phone unit can presently include only one telephone or number, this limits the range of use of the mobile unit, and prevents the possibility of using more than one cellular phone company, thus, taking advantage of different time rates and access rates. If a mobile unit could have a pair of telephone numbers, one telephone number for a first telephone company, and a second telephone number for a second telephone company, it is possible to use each phone company at those times when their rates are the lowest, in order to save money. For example, if the first telephone company offers lower rates at night, while the second telephone company offers lower rates during the day, a mobile unit having two telephone numbers could use the first telephone company's system at night, and use the second telephone company's system during the day, at considerable savings.

Further savings are achieved when a mobile unit extends beyond its home area. Typically, when a mobile unit goes beyond the defined radius of its home base (defined by the telephone company), they are charged an additional fee, called the "transit fee," for accessing a telephone company in the new region, regardless of whether it is the user-subscribed telephone company. Thus, if one were able to have two telephone numbers for the same mobile unit, the first telephone number could be used for the home-based telephone system, while the second telephone number could be used for another telephone system, or another system outside the same home-based area, when the mobile unit extends beyond the home region. Under present conditions, when a user wishes to transfer from his subscribed system to a competitor's system to achieve a better connection or complete a call outside his home area, roaming fees are also charged the customer when he uses another company's system. This roaming is usually achieved by an "A/B" switch, which switches over from even channel frequencies of the home company to the odd channel frequencies of the other company. In many cities and regions, however, it is not possible to access a second telephone company. Therefore, in addition to providing potential economical savings by having more than one telephone number for each mobile unit, it is also possible to make calls which, in certain situations, have been impossible. Further, if more than one telephone number could be used for each mobile unit, and each mobile unit could subscribe to more than one telephone company, in the event a telephone call made on one system was a poor connection, the user may readily transfer to the other system where, more often than not, the call would be a clearer connection. Also, by having more than one telephone number, each mobile unit could have one telephone number for outgoing calls only, and have the second telephone number for incoming calls only. This could be beneficial in limousines, emergency vehicles (such as ambulances), security vehicles, and the like. Further, by having more than one telephone number, one may have a separate telephone number for a frequently visited area, such as for a salesman's territory or a truck driver's route, where the user would have one telephone number for use in the area frequently visited. In this case, the user could avoid long distance costs, as well as roaming charges and transit fees.

SUMMARY OF THE INVENTION

It is, therefore, the primary objective of the present invention to provide an adapter for a conventional cellular mobile phone unit, which allows conversion of one telephone number to a plurality of telephone numbers, whereby each mobile unit may incorporate therein a plurality of identifying or telephone numbers, each having access to a telephone system and each of which may be accessed by a telephone.

It is another objective of the present invention to provide such a conversion by providing a plurality of number assignment modules, each of which has its own unique telephone number, and each of which may be uniquely coupled to the microprocessor of the mobile unit by a selection switch.

It is yet another objective of the present invention to provide such a conversion of a conventional cellular mobile phone unit to include a plurality of telephone numbers, such that the switching from one telephone number to another may be achieved easily and readily by a remote switching adjunct, so that the user of the mobile phone may transfer readily and easily from one telephone number to another at a location within the vehicle a distance away from the mobile unit.

It is still another objective of the present invention to provide an adapter for a conventional cellular mobile telephone unit that is easily connected to the NAM connection of the conventional unit in an easy and fast manner, whereby the plurality of NAM's replace the one fixed NAM provided with the conventional mobile unit.

Toward these and other ends, the adapter for a conventional cellular mobile phone unit includes a housing in which is mounted a main printed circuit board upon which are provided, in the preferred embodiment, four ROM's or Number Assignment Modules (NAM's), each of which has its unique telephone number by which the user of the system may make outgoing calls, and to which outside calls may be made, thus converting the one-telephone number conventional mobile unit to a mobile unit having a plurality of telephone numbers. The four ROM's are provided on the main circuit board, such that 15 of the 16 pin connections of each ROM are respectively connected in series, with one of the pins—the 15th pin—being left free for connection to a stop of a rotary switch. Each of the series-connected pins of the ROM's is, in turn, respectively coupled to a 16-pin jack at one end of a ribbon cable, with the pin 15 of the ROM's being selectively coupled to pin 15 of the jack via the rotary switch, whereby any of the ROM's may be activated by the rotary switch for connection to the microprocessor of the cellular mobile phone unit. The rotary switch is a 4-position rotary switch, each position of which corresponds to a different one of the ROM's, to thereby select the ROM that is to be connected to the microprocessor of the mobile phone unit, to thereby allow the change of the telephone number of that unit. The other end of the ribbon cable, to which the ROM's are connected, is coupled to the microprocessor, at that location to which the conventional ROM has been provided with the unit and upon which has been burned the unique telephone number originally provided the unit.

The rotary switch itself is mounted by the housing, such that the toggle thereof extends outward from the housing for easy access by the user of the device. In a second embodiment of the invention, the rotary switch is provided at the end of a long cable to allow for remote switching between the ROM's, so that the user of the mobile telephone system may switch in his regularly-seated position in the vehicle. The long cable is connected at its other end to a secondary printed circuit board also contained within the housing and operatively coupled to the main printed circuit board. The secondary printed circuit board includes a pair of relays, a single-pole double-throw switch, and a double-pole double-throw switch, which switches are mounted in series and operatively coupled to the rotary switch at the other end of the lead cable by three distinct current paths, so that four possible states of the output of the secondary printed circuit board may be achieved in order to activate each of the four ROM's on the main circuit board. A pair of diodes are also provided to determine the flow of current in order to achieve the four possible different states of the output of the secondary printed circuit board. The present invention may be readily converted from the trunk-mounted version, in which the rotary switch is mounted directly on the housing, to the remote version, in which the remote cable with the rotary switch at one end thereof is used for remote switching between ROM's.

The present invention is also applicable to any microprocessor accessing memory, such that there is a need for switching over from one dedicated ROM chip or the like, to another dedicated ROM chip, such as may occur in a personal computer where dedicated ROM chips are coupled to the microprocessor via an expansion slot of the personal computer. Each dedicated ROM chip may be selectively connected to the microprocessor for performing its own unique dedicated function. Thus, the effective capacity of the memory of the personal computer may be increased considerably, since the hexidecimal address location of each of the plurality of ROM's associated with the expansion slot is the same, with the switch of the present invention determining which dedicated ROM is to be coupled to the microprocessor.

BRIEF DESCRIPTION OF THE DRAWING

The invention will be more readily understood with reference to the accompanying drawing, wherein.

DETAILED DESCRIPTION

Figure 1:
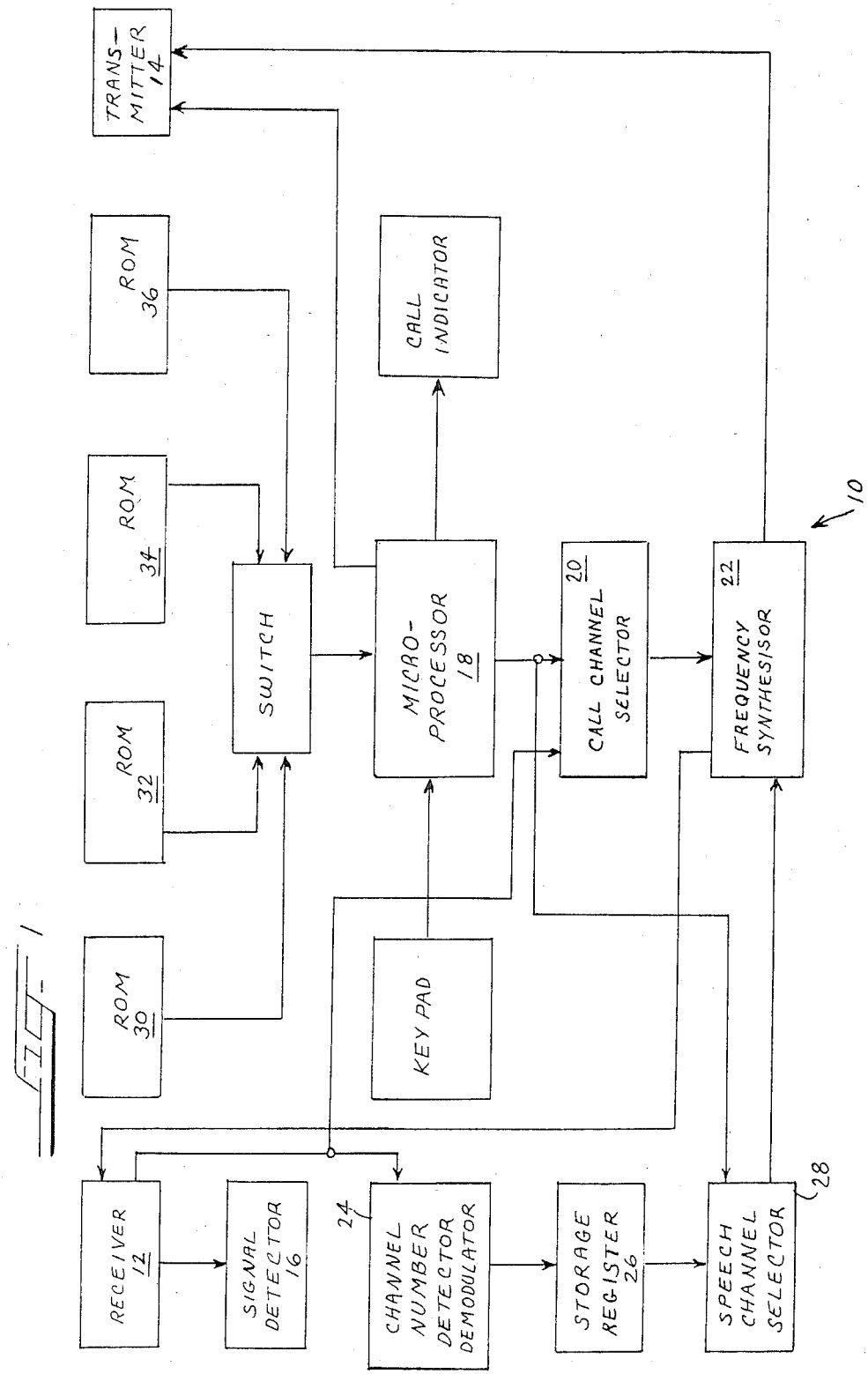
FIG. 1 is a block diagram showing the functional elements of a conventional cellular mobile phone unit to which is coupled the main circuit board of the present invention incorporating thereon a plurality of number assignment modules of the present invention.

Referring now to the drawings in greater detail, and FIG. 1 in particular, for now, a block diagram of the essential components of a cellular mobile phone unit incorporating the adapter of the present invention is shown. The mobile unit is indicated generally by reference number 10, and includes a transceiver having a receiver 12 and transmitter 14 for communication with the cells of a cell-grid structure of a cellular mobile phone system. The receiver 12 receives radio signals from the individual cells which are then detected by a signal detector 16 for inputting into a microprocessor of the unit 18. Through the microprocessor 18 and receiver 12, the call-channel selector 20 will continuously receive the signals from the receiver 12 and select the strongest signal received, as controlled by the microprocessor 18. A frequency synthesizer 22 will lock in on that strongest signal, as controlled by the call-channel selector 20. The frequency synthesizer 22 will also determine the channel in which a transmitter will send out signals. Thus, both the receiver and transmitter will lock into the appropriate call channel of the cell that is closest to the mobile unit 10, and/or the strongest signal received by the mobile unit 10.

For determining the duplex-communication channel, there is provided a channel-number detector demodulator 24 which receives the information from receiver 12, indicating the available duplex channel for the cell of which the call channel selector 22 has locked in. This duplex channel is stored in storage register 26, which is coupled to speech-channel selector 28, which is controlled by microprocessor 18, which controls frequency synthesizer 22 for locking in the duplex-communication channel open for that particular cell unit from which the strongest signals are received. The description up to this point describes that which is conventional in the art.

Associated with the microprocessor 18 are a plurality of memory locations, indicated generally by reference numerals 30, 32, 34 and 36. Each memory location 30 through 36 is a distinct and separate ROM chip, such as EPROM, upon which is burned a unique telephone or user number. The four ROM's 30 through 36 replace the one ROM in general use in conventional cellular mobile phone systems. The four ROM's provide for four different telephone numbers to which, and from which, the mobile unit 10 provides access. Hithertofore, the single ROM (commonly referred to as a number assignment module—NAM) was used, by which only one telephone number could be assigned to each mobile phone unit. According to the present invention, each mobile phone unit may be converted so that it can have a multitude of unique telephone numbers, with each number providing separate access to a telephone company and associate uses. It is understood that, although four ROM's 30 through 36 have been shown in FIG. 1, any number of such ROM's may be used to provide a multiplicity of separate and distinct telephone numbers for each mobile phone unit.

Figure 2:
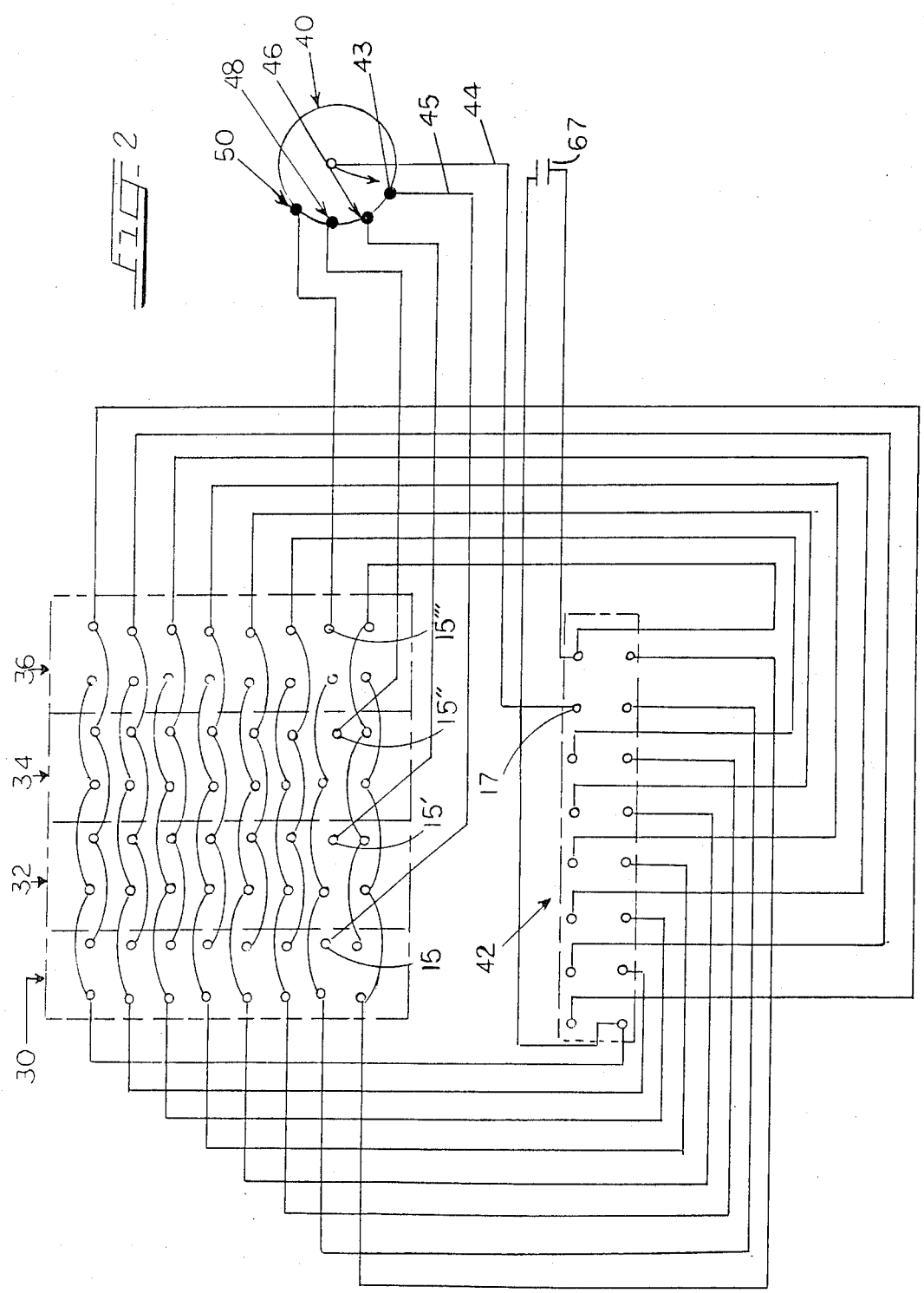
FIG. 2 is a schematic view of the main circuit board of the present invention showing the interconnection of the pins of the plurality of number assignment modules, and the interconnections between the number assignment modules and a rotary switch and plug at one end of a coupling cable of the present invention.

Referring now to FIG. 2, a schematic diagram is shown indicating the connection of the four ROM's 30 through 36 to the microprocessor 18, allowing for a multitude of telephone numbers for each individual cellular unit. The four ROM's 30 through 36 are arranged in parallel and are coupled such that the corresponding pins of each ROM are connected in series to the corresponding pins of each other ROM, as clearly shown in FIG. 2, except for pin 15 in each ROM, which pin 15 is used for connection to a switch, indicated generally by 40. Each of the corresponding and series-connected pins are, in turn, coupled to corresponding pins of a 16-pin plug at one end of a conductor ribbon cable for connecting the ROM's to the microprocessor. The 16-pin plug, indicated generally by reference numeral 42, corresponds to the 16 pins of each of the four ROM's connected in series, as described above, with each fifteenth pin 15, 15', 15'', 15''' thereof being connected to common lead 44 of the switch 40. A capacitor 67 may also be provided between pins 1 and 16 to prevent the arcing thereof. The switch 40 is a 4-position rotary switch, with each switch position coupling the 16-pin plug 42 to one of the ROM's via the free, or non-coupled, pin of each ROM. In the switch position shown in FIG. 2, the switch 40 would connect ROM 30 to the microprocessor 18, since pin 15 thereof is coupled to pin 17 of the 16-pin dip plug 42. For the switch position 46, the ROM 32 would be coupled to the microprocessor, while positions 48 and 50 would couple ROM's 34 and 36 to the microprocessor, respectively. The rotary switch 40 is a standard rotary switch.

In the preferred embodiment, the ROM's 30 through 36 are provided on a separate, main printed circuit board, in a housing enclosing both the ROM's ROM card, and associated circuitry in a coventional manner. The rotary switch 40 is typically connected to the main printed circuit card via a 5-prong male connector on the main printed circuit board, with the rotary switch being coupled to the male connector via a corresponding female connector, in a well-known manner. Four of the prongs would correspond to the four lines 45, 46, 48 and 50, which is the common line to pin 17 of the plug 42.

In the preferred embodiment, the rotary switch, main printed circuit board, associated circuitry thereon, and the connectors therefor, are enclosed in a single unitary housing having an appropriate cut-out for the extension therethrough of a 16-lead ribbon cable, for subsequent coupling of the plug 42 to the NAM input associated with the microprocessor 18. The embodiment shown in FIG. 2 is what is termed a "trunk mounted" version of the invention, in which the housing, and the associated circuitry, are mounted to the main frame of the cellular phone unit, with the toggle of the switch 40 extending outwardly from the housing for access thereto by the user of the phone, for changing over from one ROM to another, to thereby change from one telephone number to another.

Figure 3:
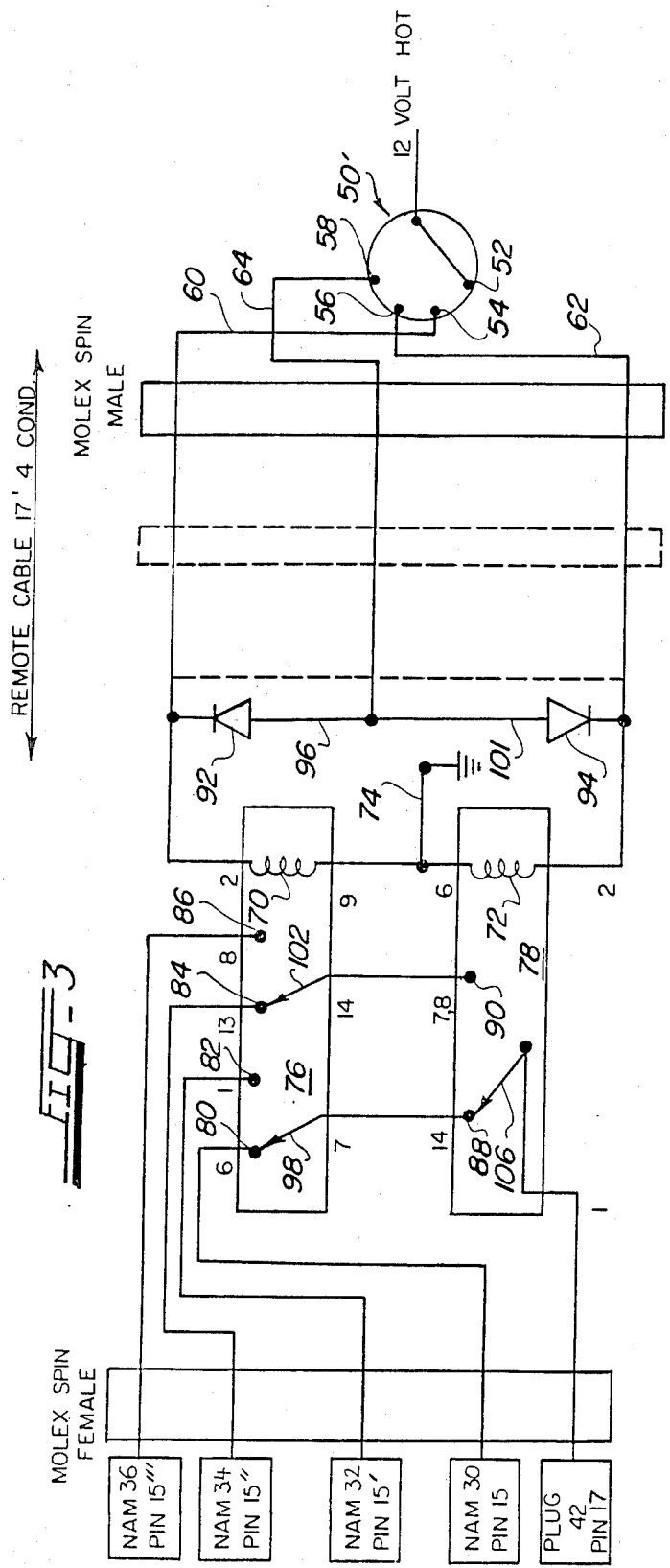
FIG. 3 is a schematic view of the remote circuit board of the present invention for remotely switching the main circuit board of FIG. 2 at location remote from the housing mounting the main circuit board, in order to switch from one number assignment module to another number assignment module while seated in the vehicle.

In a second embodiment of the invention, use is made of a remote switching device for replacing the housing-mounted switch 40. This remote switching device allows for the switching from one ROM to another, from a remote distance, for example, by a driver situated behind the steering wheel of an automobile, which would allow him to switch from one number to another from his regularly-seated position in the automobile. This embodiment is illustrated in FIG. 3. In this embodiment, a remote 4-position rotary switch 50' is provided, which is connected to one end of a long, 4-lead wire cable. Each of the four positions of the rotary switch 50', like rotary switch 40, is used to couple one of the ROM's to the microprocessor 18. The rotary position indicated by reference numeral 52 is that position in which rotary switch 50 shuts off power from a 12-volt source to the relays discussed below. The rotary positions 54, 56 and 58 are, respectively, connected to lead wires 60, 62 and 64, the ends of which are coupled to a switching circuit incorporating a pair of series-connected relays 70 and 72, with each being grounded along line 74. Each relay 70 and 72 is associated with a switch 76 and 78, respectively, with switch 76 being a double-pole double-throw switch, while switch 78 is a single-pole double-throw switch. The switch 76 includes contacts 80, 82, 84 and 86, while the switch 78 includes contacts 88 and 90. Mounted in parallel to the relays 70 and 72 are a pair of oppositely-disposed diodes 92 and 94, interconnected by lead line 96 which is coupled to the rotary position contact 58. Each of the relays 70 and 72 is connected to the rotary position contacts 54 and 56, as clearly shown in the drawing, along lines 60 and 62. It may, therefore, be seen that the rotary switch 50 determines four separate and distinct combinations of states for the switches 76 and 78, by the series connection of an arm 98 of switch 76 to a contact 88 of the switch 78, and series connection of an arm 102 of the switch 76 to contact 90 of the switch 78. Arm 106 of the switch 78 is coupled to common, which is in turn, coupled to pin 15 of the jack 42 coupling the ROM's to the microprocessor. Each of the contacts 80, 82, 84 and 86 of the switch 76 is connected to one of the ROM's 30, 32, 34 and 36. Thus, it may be seen that, depending on the relative positions of the arms of the switches 76 and 78, one of the ROM's is connected to the jack 42 for coupling to the microprocessor of the mobile phone unit to connect the unique telephone number thereto.

When the rotary switch 50' is in the first position, with the upper arm thereof contacting the contact 52 thereof, the switches 76 and 78 are in position as shown in FIG. 3. That is, the arms 98 and 102 contact the stops 80 and 84 of the switch 76, while the arm 106 contacts the stop 88, since there is no power supplied to the secondary unit, thereby de-energizing the relays 70 and 72, causing the spring-biassing of the arms of the switches to assume their normal, unpowered position shown in FIG. 3. In this state, as shown in FIG. 3, ROM or NAM 32 is powered and coupled to the microprocessor. In the second position of the rotary switch, when the arm contacts the stop 54 thereof, the current flows through the line 60 to energize relay 70 only. Diode 92 prevents current from flowing to and energizing relay 72. In this position, the arm 106 is in its position as shown in FIG. 3, while the switch 76 is energized, such that the arms 98 and 102 contact the stops 82 and 86 respectively, to thereby energize the ROM 34, since the arm 98 contacts the stop 82 of switch 76. In the third position of the rotary switch, when the arm contacts the stop 56, current flows through the line 62, and from there to the relay 72, to energize this relay to move the arm from the position shown in FIG. 3, such that the arm 106 contacts the stop 90 thereof. The diode 94 prevents current from flowing to the relay 86 in combination with the grounded line 74. In this position, the switch 76 is that shown in FIG. 3, while the arm 106 contacts the stop 90, to thereby energize and couple ROM 36 to the microprocessor. In the fourth position of the rotary switch, when the arm contacts the stop 58, current flows through line 64, and branches to each of the diodes 92 and 94, and from there to each of the relays 70 and 72, to energize both of them. Thus, each of the arms 98, 102 and 106 are in their oppositely-disposed position as compared to those shown in FIG. 3, where the arm 106 contacts the stop 90, while the arms 98 and 102 contact the stops 82 and 86 respectively, to thereby complete the connection for energizing ROM 38 and coupling it to the microprocessor through the plug 42.

It is to be noted that each of the lines running from the contacts 80, 82, 84 and 86 are connected to pin 15 of the respective ROM 32, 34, 36 and 38, in the manner similarly shown and described for the first embodiment shown in FIG. 2. The connection between the contacts and the pin is achieved via a 5-pin connection, in the same manner as previously described in the embodiment of FIG. 2. The remote cable connecting the switch 50' to the housing mounting the main circuit board on which the ROM's are mounted, and the secondary board upon which are mounted the switches 76 and 78 and associated relays and diodes, is preferably 17 feet in length to allow adequate remote control thereby.

Figure 4:
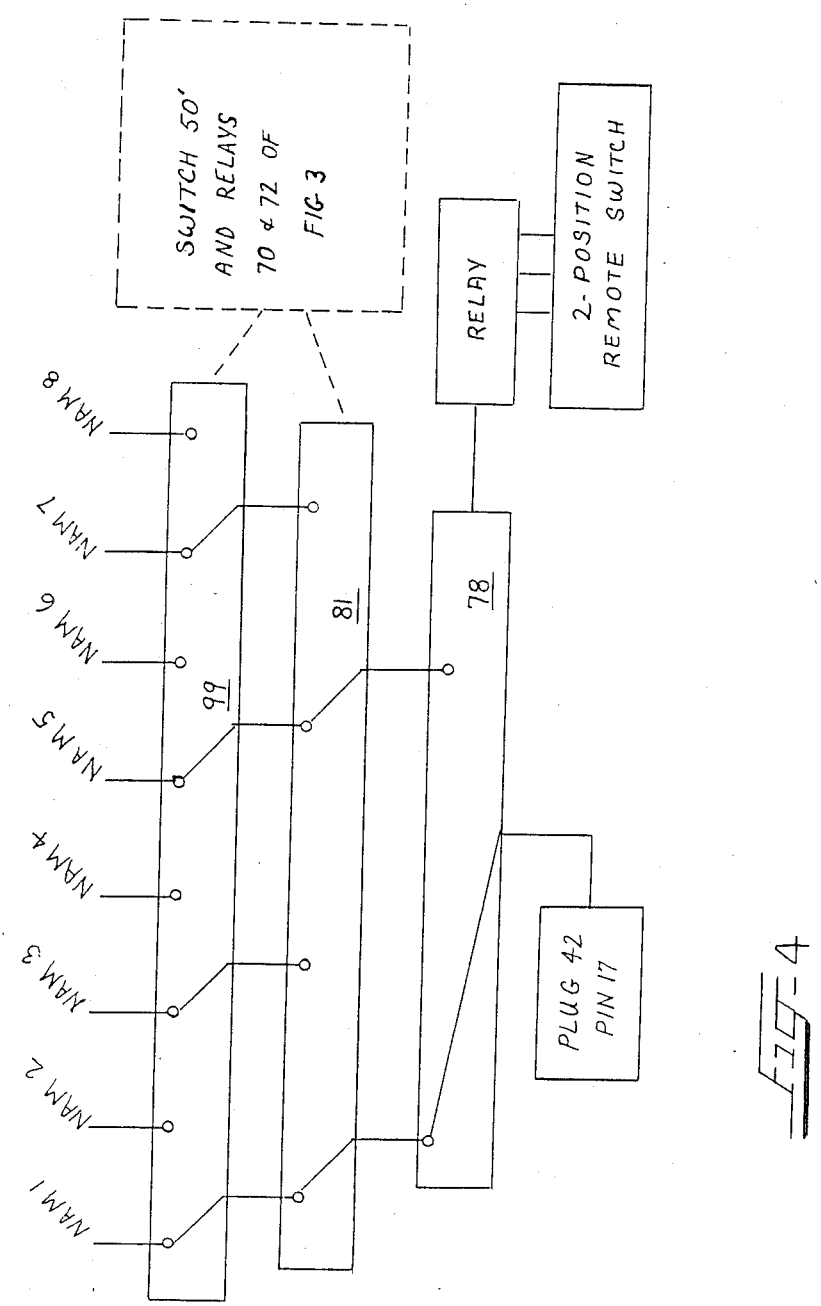
FIG. 4 is a schematic view showing a modification of the remote circuitry of FIG. 3 for eight possible telephone numbers.

It is clear that more or less than four ROM's may be used to provide greater or fewer telephone numbers for the single cellular mobile phone unit. If less than four ROM's were to be used, the same general switching arrangement may be used as above-described for the trunk-mounted version or for the remote switching version. If more than four ROM's are to be used than in the trunk-mounted version, a rotary switch having as many stop positions as the number of ROM's would be used. For the remote switching version, the same general principles as that shown in FIG. 3 would be used. If, for example, eight ROM's were to be used, the switch 76 would be replaced by the 8-position switch 99 having four movable arms, while the switch 78 would be replaced by a double-pole double-throw switch 81, and the rest of the circuitry shown in FIG. 3 would be exactly the same, except the outputs from the 8-contact switch would each be connected to one of the eight ROM's. An additional single-pole double-throw switch circuit is provided, which would be controlled manually by a switch adjacent an 8-position rotary switch for the eight ROM's as shown in FIG. 4. Thus, any one of the eight ROM's may be connected to the microprocessor, according to the same general principles as above-described, where there are four ROM's provided.

It is also to be understood that the present invention has relevance and use for any microprocessor, whether it is for a cellular mobile phone unit, or a microprocessor of a personal computer. For example, in a personal computer, when it is desired to add additional memory capacity to the computer via an expansion slot, the concept of the present invention may also be used, where each of the ROM's 30, 32, 34 and 36 would be a dedicated ROM to perform a specified function, whether it is for the control of an electromechanical means by the computer, and the like. The only difference, according to the two different uses, would be the information burned into the ROM's for their dedicated use. Thus, according to the principle of the present invention, when used with a personal computer's expansion slot and coupled to the microprocessor thereof, since the addressing locations of each of the ROM's in the expansion slot would be identical, by simply switching from one to another, the dedicated software therein may be changed, thereby effectively increasing the memory storage of the computer. By simply switching from one ROM to the other, the dedicated program may be altered without sacrificing addressing locations of the microprocessor of the personal computer.

While this invention has been disclosed for use with ROM's clearly one could use PROM's, EPROM's and EEPROM's, and while specific embodiments of the invention have been shown and described, it is to be understood that numerous changes and modifications may be made therein without departing from the scope, spirit and intent of the invention, as set out in the appended claims.

What is claimed is:

1. A method of using a cellular mobile telephone unit, which cellular mobile phone telephone comprises a microprocessor, comprising:
    (a) simultaneously providing at least first and a second distinct user telephone numbers in a memory means;
    (b) selecting one of the at least first and second distinct user telephone numbers to be used for making an outgoing call based thereon;
    (c) said step (b) comprising coupling the selected one of the distinct user telephone numbers to the microprocessor of the cellular mobile telephone unit.

2. The method according to claim 1, further comprising repeating said steps (a), (b) and (c) a plurality of times so as to make an outgoing call based on the first telephone number and the second telephone call on another telephone number.

3. The method according to claim 1, wherein said step (b) comprises making an outgoing call on a first cellular mobile phone system, and making an outgoing call on another cellular mobile phone system.

4. The method according to claim 1, wherein said step (c) comprises manually switching the selected distinct telephone number to the microprocessor of the cellular mobile telephone unit.

5. A method of using a cellular mobile telephone unit, which cellular mobile telephone unit comprises a microprocessor, comprising:
    (a) simultaneously providing at least two distinct user telephone numbers in a memory means, whereby the microprocessor of the cellular mobile telephone unit may access any one of the distinct telephone numbers;
    (b) selecting one of the at least two distinct user telephone numbers, said step of selecting comprising selectively and exclusively coupling one of the at least two distinct user telephone numbers to the microprocessor;
    (c) receiving an incoming call on the selected one of at least two distinct user telephone numbers;
    (d) switching over to another distinct user telephone number, said step of switching over comprising coupling the microprocessor of the cellular mobile telephone unit to the memory means storing therein the representation of said another distinct telephone number, said step further comprising simultaneously decoupling a portion of the memory means storing therein the representation of the one distinct user telephone number previously coupled to the microprocessor during said step (b); and
    (e) receiving an incoming call via said another distinct user telephone number provided via said step (d).

6. The method according to claim 5, wherein said step (e) comprises receiving an incoming call via a different cellular mobile phone system, as compared to the cellular mobile phone system by which the incoming was received during said step (c).

* * * * *